United States Patent [19]

Yoshida et al.

[11] Patent Number: 4,665,884
[45] Date of Patent: May 19, 1987

[54] IGNITION CONTROL APPARATUS FOR INTERNAL COMBUSTION ENGINE

[75] Inventors: Tatsuya Yoshida, Katsuta; Toshio Furuhashi, Mito, both of Japan

[73] Assignee: Hitachi, Ltd., Tokyo, Japan

[21] Appl. No.: 850,026

[22] Filed: Apr. 10, 1986

[30] Foreign Application Priority Data

Apr. 10, 1985 [JP] Japan .................................. 60-76223

[51] Int. Cl.⁴ ............................. F02P 9/00; F02P 5/00
[52] U.S. Cl. .................................. 123/609; 123/416; 123/417
[58] Field of Search ....................... 123/609, 416, 417; 340/870.24

[56] References Cited

U.S. PATENT DOCUMENTS

| | | | |
|---|---|---|---|
| 4,127,091 | 11/1978 | Léichlé | 123/416 |
| 4,239,024 | 12/1980 | Léichlé | 123/416 |
| 4,321,580 | 3/1982 | Deharis | 340/870.24 |
| 4,367,710 | 1/1983 | Deharis | 123/416 |
| 4,489,689 | 12/1984 | Avian et al. | 123/609 |

Primary Examiner—Raymond A. Nelli
Attorney, Agent, or Firm—Antonelli, Terry & Wands

[57] ABSTRACT

Disclosed is an ignition control apparatus for an internal combustion engine arranged to control an ignition timing and a current conduction initiating timing on the basis of a time elapsed from a point in time at which a reference position is reached by a crank shaft, in which a crank reference position detector is caused to generate a crank reference position signal which is reversed in polarity at a crank reference position of each cylinder of the engine as well as at an intermediate position between a preceding and a succeeding timing at the crank shaft reference position, and a leading edge and a trailing edge of the crank reference position signal are detected so as to determine each of the detection of the revolutional speed of the engine, the ignition timing, and the period of current conduction on the basis of a time elapsed from the detected leading edge or the trailing edge. Thus, it is possible to perform the ignition control accurately by using only one sensor synchronized with the revolution of said engine.

4 Claims, 7 Drawing Figures

IGNITION CONTROL APPARATUS FOR INTERNAL COMBUSTION ENGINE

BACKGROUND OF THE INVENTION

The present invention generally relates to an ignition control apparatus for an internal combustion engine, and particularly relates to an ignition control apparatus for an internal combustion engine, in which an ignition timing and a current conduction initiating timing are controlled on the basis of a period of time elapsed from a reference position.

In an ignition control apparatus arranged to calculate an optimum ignition timing and an optimum current conduction initiating timing in accordance with the running state of an engine so as to determine an ignition timing and a current conduction initiating timing on the basis of time elapsed from a reference position, if the revolutional speed of an internal combustion engine is suddenly changed, the ignition timing is not controlled before the succeeding reference position signal is received to cause a delay in revolutional angle to thereby cause a delay in control to make the current conduction period of time insufficient, so that a miss burn may be caused and variations in ignition timing become larger. Consequently, it is necessary to detect the revolutional speed of the engine as quickly as possible, and it is preferable to make the time elapsed from the reference position for use for the determination of ignition timing shorter as much as possible. To this end, conventionally, as disclosed in a prior art reference, for example, Japanese Patent Unexamined Publication No. 84860/80, the time elapsed from a reference position has been made shorter by generating 24 pulses in one revolution (360 degrees) of a distributor. It is impossible, however, to detect a reference position of a crank, for example, a top dead center (a TDC) merely by the generation of those 24 pulses, and therefore it has been required to generate two TDC pulse signals for the discrimination of the reference position in addition to the 24 pulses in every revolution of the distributor. As described above, in the conventional technique, it has been necessary to provide two or more sensors revolved in synchronism with the revolution of the engine for accurately detecting the crank reference position, and therefore there has been such a disadvantage that the cost is increased correspondingly.

SUMMARY OF THE INVENTION

It is therefore a main object of the present invention to provide an ignition control apparatus for an internal combustion engine, in which ignition control can be accurately performed by using only one sensor synchronized with the revolution of an engine.

It is another object of the present invention to provide an ignition control apparatus for an internal combustion engine, in which the revolutional speed of the engine is detected every time a crank shaft rotates by 90 degrees so as to calculate the ignition timing and the current conduction initiating timing, so that the ignition timing can be accurately controlled against variations in revolutional speed of the engine.

In order to attain the objects as described above, according to the present invention, a crank reference position detector is caused to generate a crank reference position signal which is reversed in polarity at a crank reference position, for example, a position 5 degrees before a top dead center (BTDC5°) of each cylinder of the engine as well as at an intermediate position between a preceding and a succeeding timing at the crank shaft reference position, and a leading edge and a trailing edge of the crank reference position signal are detected so as to determine each of the detection of the revolutional speed of the engine, the ignition timing, and the period of current conduction on the basis of a time elapsed from the detected leading edge or the trailing edge, to thereby perform accurate ignition control.

The above and other objects and features of the invention will appear more fully hereinafter from a consideration of the following descriptions taken in connection with the accompanying drawings.

DESCRIPTION OF THE PREFERRED EMBODIMENT

Referring to the drawings, the ignition control apparatus for an internal combustion engine according to the present invention will be described in detail hereunder.

Figure 1:
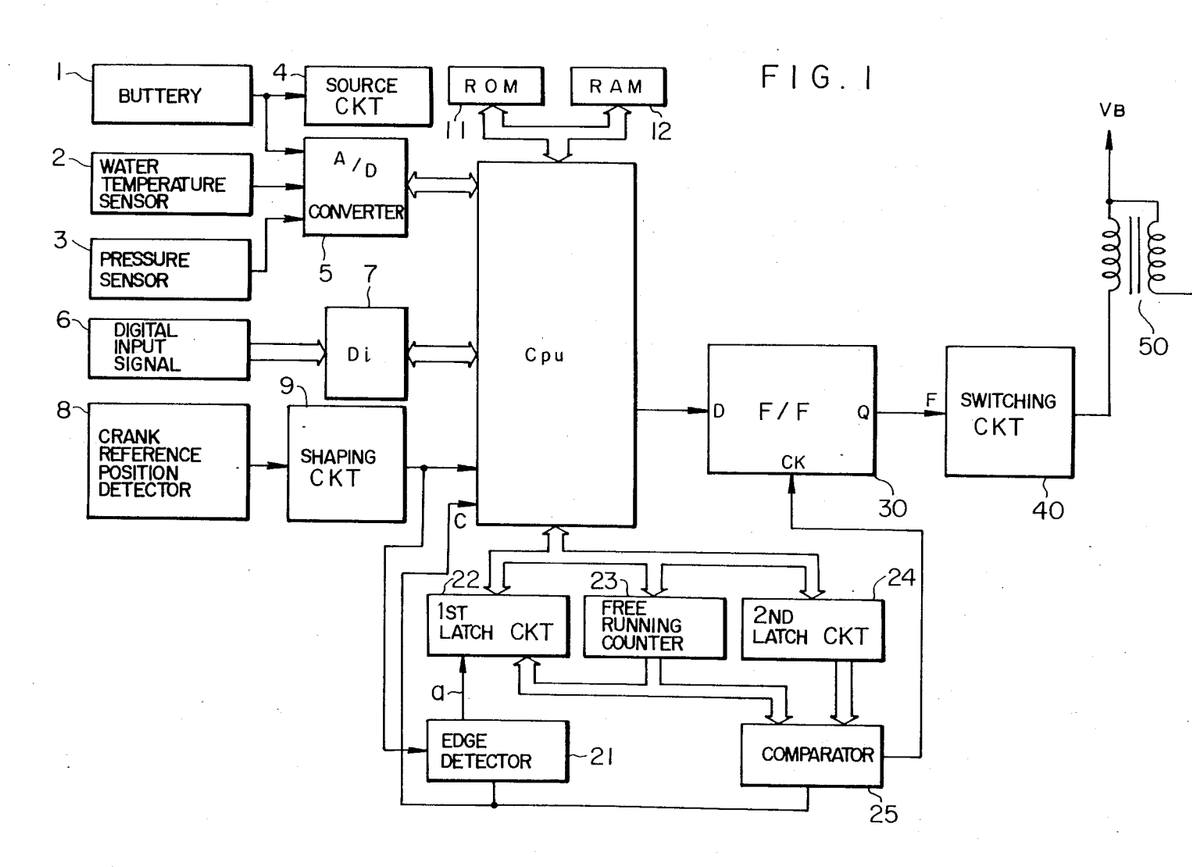
FIG. 1 is a block diagram showing an embodiment of the ignition control apparatus for an internal combustion engine according to the present invention.

FIG. 1 is a block diagram showing an embodiment of the ignition control apparatus according to the present invention. The ignition control apparatus of the type as shown in this embodiment is applied to a four-cycle four-cylinder internal combustion engine. Further, FIG. 2 shows respective waveforms of input/output signals shown in FIG. 1 and interruption timings.

In FIG. 1, the reference numeral 1 designates a battery connected to a power supply circuit 4 for energizing each block; 2, a water temperature sensor for detecting a temperature of cooling water for the engine; and 3, a pressure sensor for detecting a pressure in an intake manifold of the engine. Respective analog signals from the battery 1, the water temperature sensor 2, and the pressure sensor 3 are subject to analog-to-digital (A/D) conversion by an A/D converter 5, and the A/D-converted data are taken into a CPU 10 at predetermined timings. The reference numeral 6 designates a group of digital signals for detecting various running conditions such as an idling state, etc., of the engine, including, for example, a signal representing a fully opened state of a throttle. Each of these digital signals 6 is applied to the CPU 10 through a digital input interface (D$_i$) 7 for shaping the waveform of the digital signal.

Figure 2:
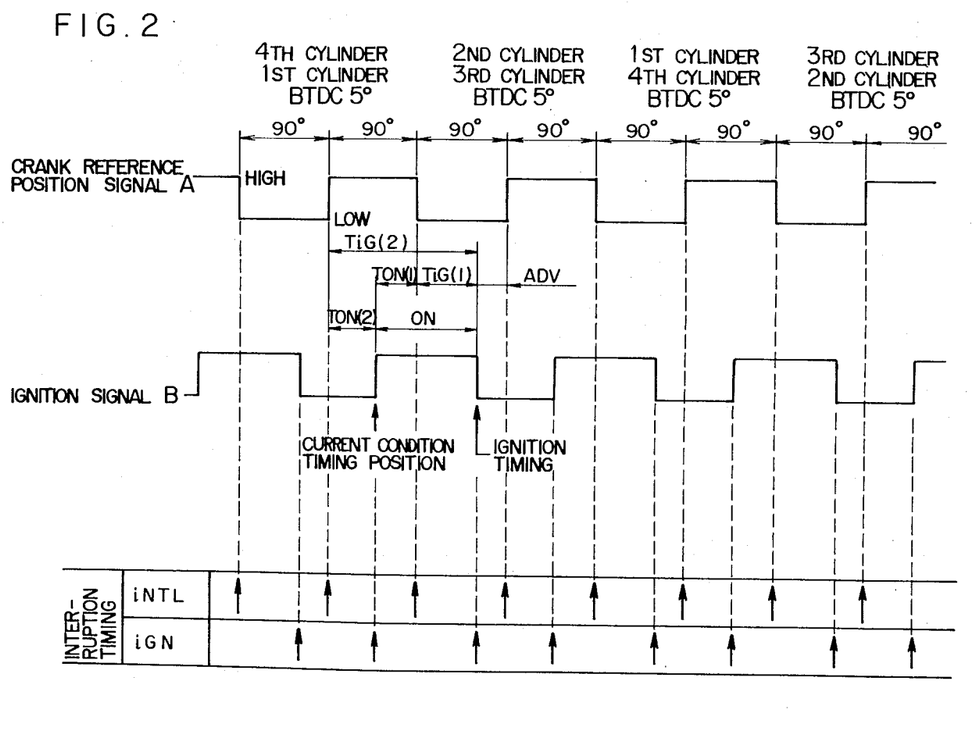
FIG. 2 is a diagram showing respective operational waveforms of input/output signals shown in FIG. 1 and interruption timings.

The reference numeral 8 designates a crank reference position detector acting as a reference position sensor, and this crank reference position detector 8 applies an output signal to a shaping circuit 9, in which the signal is shaped so that the signal has a level of "high" ("low" in another embodiment) at a crank reference position, for example, a 5°-before top dead center (BTDC5°), of each cylinder, while takes a level of "low" ("high" in another embodiment) at an intermediate position between the preceding crank reference position and the succeeding crank reference position, thereby producing a crank reference position signal A successively as shown in FIG. 2. The relation between "high" and "low" of the level of the crank reference position signal may be reversed. In this embodiment according to the present invention, the crank reference position is set within a range from BTDC10° to TDC.

The reference numeral 23 designates a free running counter for always performing a counting operation with a predetermined period, for example, 1 sec in this embodiment; and 21, an edge detector for detecting of a leading edge and a trailing edge of the crank reference position signal A to thereby supply a reference position interruption iNTL to the CPU 10 as well as to a first latch circuit 22 through a line. The first latch circuit 22 holds the contents of the free running counter 23 in response to the reference position interruption iNTL acting as a latch signal from the edge detector 21. That is, the contents of the free running counter 23 at one reference position interruption iNTL representing either one of a leading edge and a trailing edge of the crank reference position signal A is held until the succeeding reference position interruption iNTL representing the next one of a trailing edge or a leading edge of the crank reference position signal A.

Figure 3:
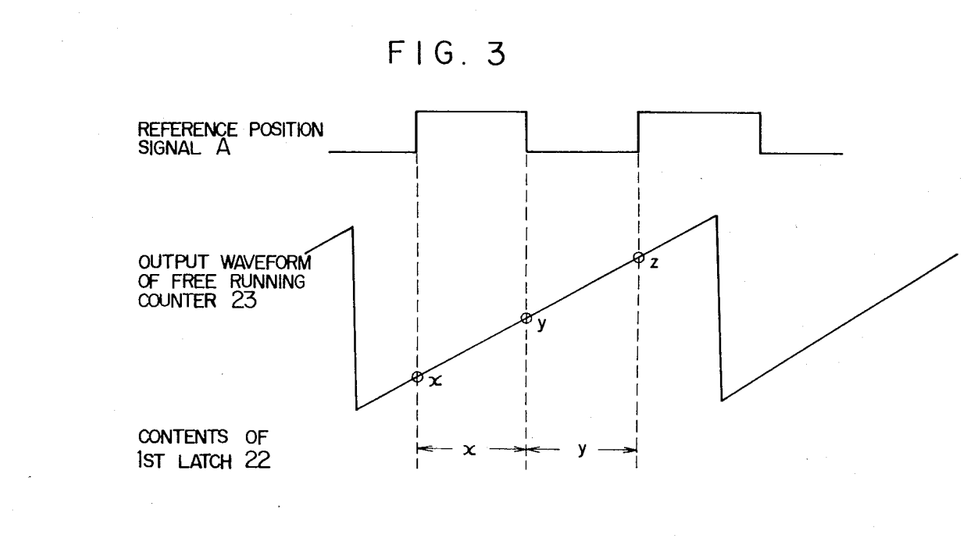
FIG. 3 is a diagram showing the relationship between a reference position signal A and an output signal from the free running counter 23, for explaining the present invention.

FIG. 3 shows the relationship between the crank reference position signal A and the contents of the free running counter 23. In FIG. 3, assuming that the count of the free running counter 23 at a leading edge of the crank reference position signal A is represented by x, this value x is taken into the first latch circuit 22 so as to make the contents of the first latch circuit 22 be the value x. Next, when the count of the free running counter 23 at a succeeding trailing edge of the crank reference position signal A is y, similarly to the preceding case of the value x, this value y is taken into the first latch circuit 22 to make the contents of the first latch circuit 22 be the value y.

Upon reception of the foregoing input signals, the CPU 10 takes thereinto the respective values of the revolutional speed of the engine, the pressure in the intake manifold, etc., on the basis of a program stored in advance in an ROM 11 so as to perform operations with respect to the ignition timing advance angle and the current conduction period, and on the basis of the result of operations, calculates an ignition timing data as well as a current conduction initiating timing data to be actually produced. The reference numeral 12 designates a random access memory RAM for storing time-varying data, etc.

The reference numeral 24 designates a second latch circuit for holding data from the CPU 10. The respective contents of the second latch circuit 24 and the free running counter 23 are always compared with each other by a comparator 25. When the contents of the second latch circuit 24 and the free running counter 23 coincide with each other, the comparator 25 generates an interruption pulse signal C which is applied to an input C of the CPU 10. The interruption pulse signal from the comparator 25 is applied also to a clock terminal CK of a flip-flop 30 as a clock signal, so that the flip-flop 30 produces an output signal F at its output terminal Q on the basis of data from the CPU 10 in response to the clock signal. The output signal F from the flip-flop 30 is applied to a switching circuit 40 which in turn performs ON-OFF operations for an ignition coil 50.

FIG. 2 shows reference position interruptions iNTL generated at the respective leading and trailing edge of the crank reference position signal A, as well as ignition signal interruptions iGN generated every time when the respective contents of the free running counter 23 and the second latch circuit 24 coincide with each other. That is, the ignition signal interruptions iGN are generated at the respective leading and trailing edges of an ignition signal. The reference point interruptions iNTL and the ignition signal interruptions iGN are applied to the CPU 10 at the timings as shown in FIG. 2. Besides the foregoing interruptions, timer interruptions are generated about every 10 m sec. In response to the thus produced various interruptions, the CPU 10 performs processing corresponding to each interruption.

Figure 4:
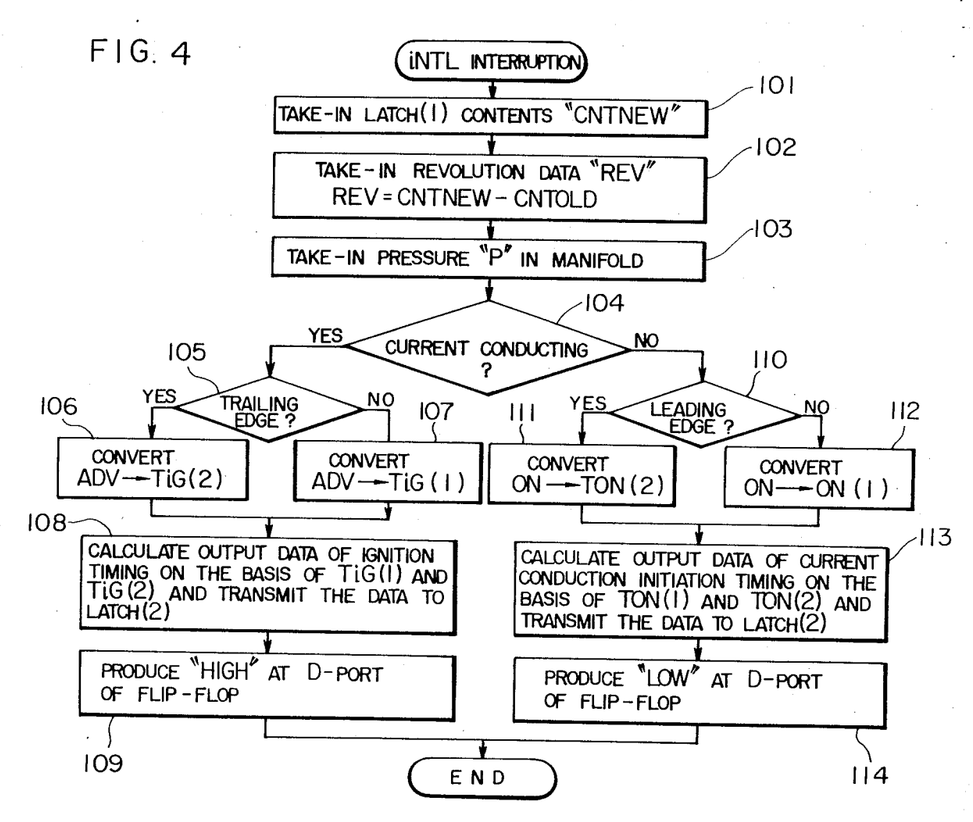
FIG. 4 is a flowchart for executing a routine of the iNTL interruption processing among various processing operations performed in the embodiment shown in FIG. 1.
Figure 6:
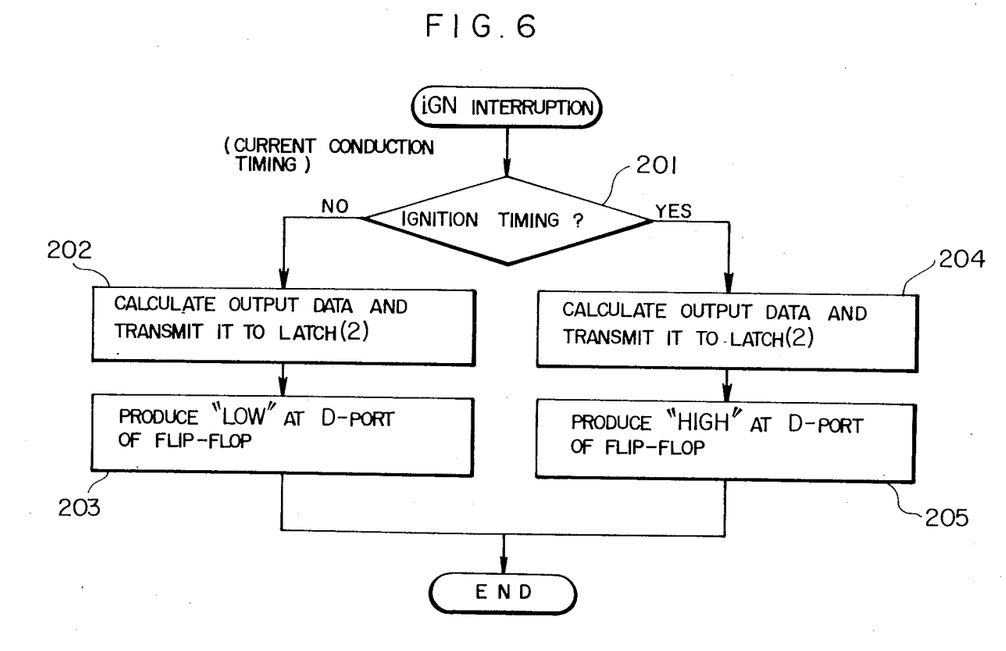
FIG. 6 is a flowchart for executing a routine of the iGN interruption processing among various processing operations performed in the embodiment shown in FIG. 1.
Figure 7:
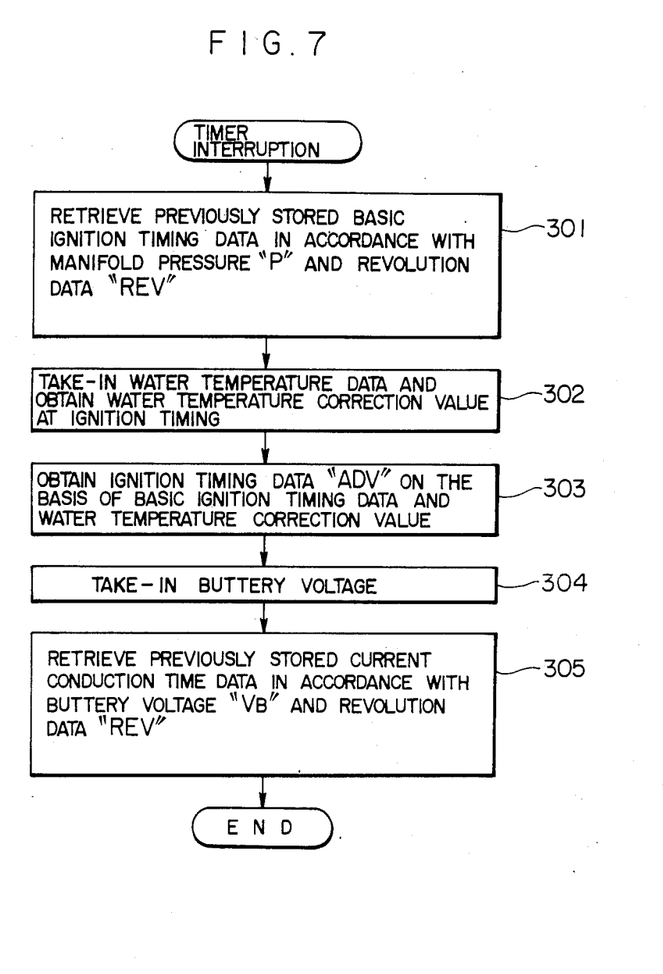
FIG. 7 is a flowchart for executing a routine of the timer interruption processing among various processing operations performed in the embodiment shown in FIG. 1.

Now, the operations of the circuits of FIG. 1 will be described. FIGS. 4, 6 and 7 show routines for processing the reference position interruption iNTL, the ignition signal interruption iGN, and the timer interruption, respectively. When the reference position interruption iNTL is generated at a leading or trailing edge of the crank reference position signal A of FIG. 2, the CPU 10 performs the iNTL interruption routine of FIG. 4. In FIG. 4, in a step 101, the content of the first latch circuit 22 is taken into the RAM 12 so as to be stored in a memory area CNTNEW in the RAM 12. In a step 102, the revolutional speed data, that is, a revolutional period REV (a period of time taken for the crank to rotate by 90 degrees) which is obtained through the following expression (1) and which is proportional to a reciprocal of the revolutional speed of the engine, is taken into the CPU 10.

$$REV = CNTNEW - CNTOLD \tag{1}$$

where the CNTOLD is the old value of the preceding CNTNEW.

That is, the revolutional speed of the engine is always detected every revolution of 90 degrees of the crank shaft.

Figure 5:
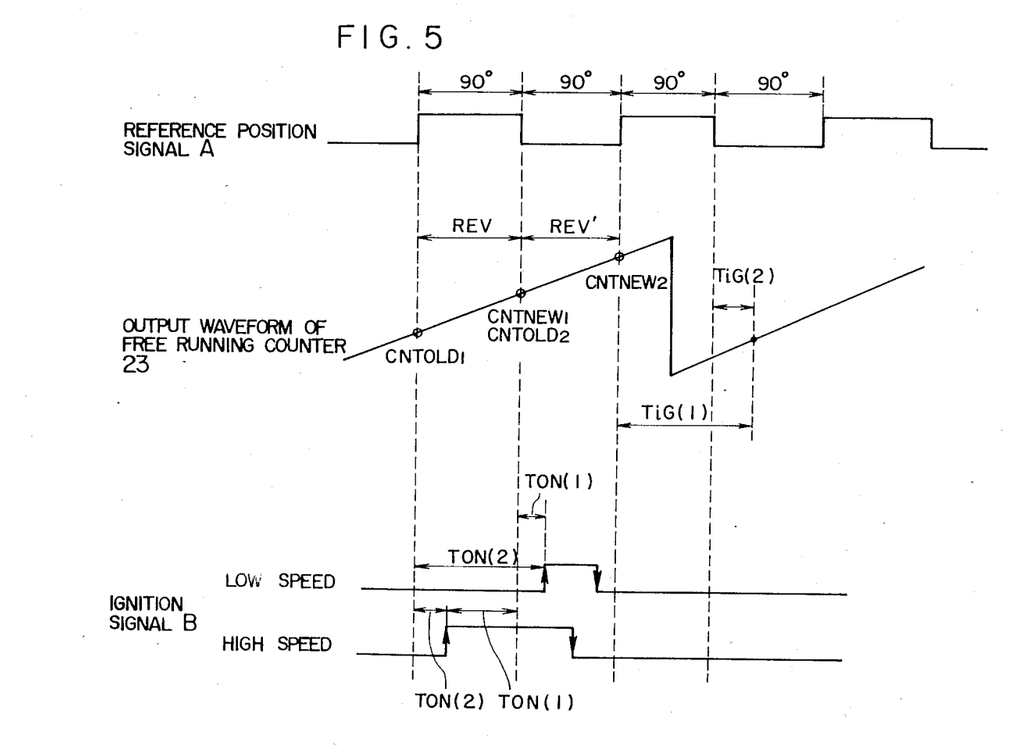
FIG. 5 is a diagram showing the relationship between a reference position signal, an output signal from the free running counter 23, and an ignition signal for explaining the present invention.

FIG. 5 shows the relationship between the reference position signal A, the output signal from the free running counter 23, and the ignition signal B. In FIG. 5, the value REV obtained through the expression (1) is defined as a difference between a point CNTNEW 1 and a point CNTOLD 1 on a waveform of the output signal of the free running counter 23 respectively corresponding to a leading edge and a trailing edge of the reference position signal A. Similarly to this, the succeeding value REV' is defined as a difference between a point CNTNEW 2 and a point CNTOLD 2 (which is the point CNTNEW 1) on the waveform of the output signal from the free running counter 23 respectively corresponding to the succeeding leading and trailing edges of the reference position signal A.

In a step 103, an A/D converted value of the pressure P in the intake manifold is taken into the CPU 10.

In the case where judgement proves in a step 104 that the ignition coil 50 is in a current-conduction state, ignition timing output processing is performed. In a step 105, judgement is made as to whether the iNTL interruption is generated at a leading edge or at a trailing edge of the reference position signal A, and in the case where the iNTL interruption is generated at the leading edge, a period of time TiG(2) from the leading edge of the reference position signal A to the ignition timing is obtained on the basis of the ignition advance timing data ADV in a step 106. If the iNTL interruption has been generated at a trailing edge of the reference position signal A, on the other hand, the ignition advance timing data ADV is converted into a period of time TiG(1) from the trailing edge of the reference position signal A to the ignition timing in a step 107. In a step 108, an output data is calculated through the following expression (2) on the basis of the period of time TiG(1) or TiG(2) obtained in the steps 107 or 106 respectively.

$$\left.\begin{array}{l}\text{Output data} = TiG(1) + CNTNEW \\ \text{Output data} = TiG(2) + CNTNEW\end{array}\right\} \quad (2)$$

The relationship of these expressions will be apparent from FIG. 5. Thus calculated output data is supplied to the second latch circuit 24, and in a step 109, "high" is applied at a D port of the flip-flop 30.

If the judgement proves in the step 104 that the ignition coil 50 is not in the current-conduction state, that is, in a non-current conduction state, on the contrary, current conduction initiating timing data output processing is effected. In a step 110, judgement is made as to whether the iNTL interruption has been generated at a leading edge or a trailing edge of the reference position signal A. If the judgement proves that the iNTL interruption has been generated at a leading edge, the current conduction period of time data ON is converted into a period of time TON (2) from the leading edge of the reference position signal A to the current conduction initiating timing, in a step 111. In the case where the iNTL interruption has been generated at a trailing edge of the reference position signal iNTL, on the other hand, the current conduction period of time data ON is converted into a period of time TON (1) from the trailing edge of the reference position signal A to the current conduction initiating timing, in a step 112. In a step 113, an output data is calculated through the following expression (3) on the basis of the period of time TON (1) or TON (2) obtained in the steps 112 or 111 respectively.

$$\left.\begin{array}{l}\text{Output data} = TON(1) + CNTNEW \\ \text{Output data} = TON(2) + CNTNEW\end{array}\right\} \quad (3)$$

The expressions (3) will be apparent from FIG. 5. The calculated output data is applied to the second latch circuit 24, and a level "low" is produced at the D port of the flip-flop 30, in a step 114.

The iGN interruptions are generated at a leading edge as well as a trailing edge of the ignition signal B as shown in FIG. 2, that is, generated for a current-conduction initiating timing as well as an ignition timing. In the iGN interruption processing, in a step 201, judgement is made as to whether the iGN interruption has been generated for an ignition timing or for a current conduction initiating timing, and if the judgement is proved that the iGN interruption has been generated for a current conduction initiating timing, an ignition timing output data is calculated through the following expression (4), in a step 202.

$$\text{Ignition timing output data} = \quad (4)$$
$$\text{the contents of the second latch circuit 24} + ON$$

The thus calculated data is transferred to the second latch circuit 24, and level "low" is produced at the D port of the flip-flop 30, in a step 203. If the judgement proves that the iGN interruption has been generated for an ignition timing, on the contrary, in a step 204, a current conduction initiating timing output data is calculated through the following expression (5).

$$\text{Current conduction initiating timing output data} = \quad (5)$$
$$\text{(the contents of the second latch circuit 24} + (2 \times REV) - ON$$

The thus calculated data is supplied to the second latch circuit 24, and a level "high" is produced at the D port of the flip-flop 30, in a step 205.

In the processing of timer interruption periodically performed every 10 m sec, a basic ignition timing data stored in advance is retrieved on the basis of the revolutional speed data REV and the pressure P in the intake manifold in a step 301, and an A/D converted value of water temperature data is taken into the CPU 10 in a step 302 so as to obtain a correction value corresponding to the water temperature at the ignition timing. In a step 303, an ignition advance timing data ADV is obtained on the basis of the basic ignition timing data and the water temperature correction value. An A/D converted value of the battery voltage is taken into the CPU 10 in a step 304, and the current conduction period of time data ON stored in advance is retrieved on the basis of the value of the battery voltage and the revolutional speed data REV in a step 305.

Accordingly, in this embodiment, the revolutional speed of the engine is detected for every revolution of 90 degrees of the crank shaft so as to perform the operations for obtaining the ignition timing and the current conduction initiating timing respectively, resulting in such a superior effect that it is possible to accurately control the ignition timing against variations in revolutional speed of the engine.

Further, in this embodiment, it is possible to control the ignition signal by using only one reference position signal, and therefore by using only one single revolutional speed sensor which is constituted by a crank reference position detector and which is synchronized with the resolution of the engine. Accordingly, it is possible to obtain a further superior effect that it is possible to increase freedom in design of the engine to reduce the cost thereof.

We claim:

1. In an internal combustion engine, an ignition control apparatus arranged to calculate an optimum ignition timing and an optimum current conduction initiating timing in accordance with a running state of said engine so as to determine an ignition timing and a current conduction initiating on the basis of a time elapsed from a point in time at which a reference position is reached by a crank shaft, said apparatus comprising:

crank reference position detecting means for producing a crank reference position pulse signal which is reversed in polarity at said crank shaft reference position and an intermediate position between a preceding and a succeeding timing at said crank shaft reference position;

means for generating interruptions including a reference position interruption produced at each of a leading edge and a trailing edge of said crank reference position pulse signal;

means for judging whether said reference position interruption is generated at a leading edge or a trailing edge of said crank reference position pulse signal; and means for detecting a revolutional speed of said engine every time when said reference position interruption is generated.

2. An ignition control apparatus according to claim 1, in which said reference position of said crank is formed within a range from 10 degrees angularly before a top dead center of a cylinder of said engine to said top dead center.

3. An ignition control apparatus according to claim 1, in which said interruption generating means produces an ignition signal interruption (iGN) and a timer interruption in addition to said reference position interruption (iNTL).

4. An ignition control apparatus according to claim 1, in which said engine revolutional speed detecting means is constituted by a CPU, an edge detector, a latch circuit, and a free running counter.

* * * * *